United States Patent [19]

Owen et al.

[11] Patent Number: 6,059,274
[45] Date of Patent: May 9, 2000

[54] VIBRATION REDUCTION SYSTEM USING IMPEDANCE REGULATED ACTIVE MOUNTS AND METHOD FOR REDUCING VIBRATION

[75] Inventors: Archibald Owen, Stow; Jonathan Korn, Brookline; Paul Remington, Sudbury, all of Mass.

[73] Assignee: GTE Internetworking Incorporated, Burlington, Mass.

[21] Appl. No.: 09/304,025

[22] Filed: May 3, 1999

Related U.S. Application Data

[60] Provisional application No. 60/084,135, May 4, 1998.

[51] Int. Cl.[7] ............................................. F16M 1/00
[52] U.S. Cl. ........................ 267/136; 188/267; 267/140.14
[58] Field of Search ..................................... 188/378, 379, 188/380, 267, 382; 248/550; 267/136, 140.14, 140.15, 140.11

[56] References Cited

U.S. PATENT DOCUMENTS

| | | | |
|---|---|---|---|
| 5,150,875 | 9/1992 | Holloway, III et al. | 248/550 |
| 5,310,137 | 5/1994 | Yoerkie, Jr. et al. | 244/17.27 |
| 5,452,884 | 9/1995 | Gugsch et al. | |
| 5,456,341 | 10/1995 | Garnjost et al. | 188/378 |
| 5,526,292 | 6/1996 | Hodgson et al. | 244/1 N |
| 5,587,615 | 12/1996 | Murray et al. | |
| 5,615,868 | 4/1997 | Murray | |
| 5,620,068 | 4/1997 | Garnjost et al. | 188/378 |
| 5,638,305 | 6/1997 | Kobayashi et al. | 700/280 |
| 5,695,027 | 12/1997 | Von Flotow et al. | 188/380 |
| 5,796,849 | 8/1998 | Coleman et al. | |
| 5,831,401 | 11/1998 | Coleman et al. | |
| 5,887,858 | 3/1999 | Su | |

*Primary Examiner*—Robert J. Oberleitner
*Assistant Examiner*—Melanie Talavera
*Attorney, Agent, or Firm*—Leonard Charles Suchyta

[57] ABSTRACT

A vibration reduction system including a base, a disturbance generating device, and at least one active mount connecting the base and disturbance generating device for imparting a force at a point on the base to minimize the transmission of the disturbance to the base. The active mount includes a passive element on which the disturbance generating device is supported, an actuator for imparting a force on at least the base, a sensor located on the base for sensing the total force imparted by the active mount at the selected point and generating a corresponding signal, and a controller for generating an input signal corresponding to the force to be imparted by the actuator on at least the base and sending the input signal to the actuator. The controller regulates an impedance error as a function of the signal received from the sensor to generate the input signal. The force imparted by the active mount at the selected point on the base substantially counteracts the disturbance applied to the base by the disturbance generating device. The active mount further includes a second sensor located on the base for detecting a velocity or acceleration of the base at the point on the base. The invention also includes a method of reducing vibrations of a base caused by a disturbance generating device mounted on the base via an active mount.

14 Claims, 10 Drawing Sheets

VIBRATION REDUCTION SYSTEM USING IMPEDANCE REGULATED ACTIVE MOUNTS AND METHOD FOR REDUCING VIBRATION

CROSS-REFERENCE TO RELATED APPLICATIONS

This application claims priority under 35 U.S.C. § 119 based on U.S. Provisional Application Ser. No. 60/084,135, filed May 4, 1998, the disclosure of which is incorporated by reference.

BACKGROUND OF THE INVENTION

1. Field of the Invention

This invention relates generally to a vibration reduction system for reducing structural vibrations and noise, and more particularly, to a system and method that uses impedance regulated active mounts.

2. Description of the Related Art

A variety of systems have been proposed and implemented for reducing noise and vibration acting on structures. In a typical structural-acoustic system, an excitation energy or disturbance is generated in a structure. This disturbed structure will be referred to as a deck. A deck is a platform for any type of disturbance-creating machine or machines including, but not limited to turbines, generators, pumps, and motors. This deck is attached to a second structure at a finite number of discrete locations. The deck typically transmits vibratory energy and noise to the second structure through these discrete attachments. This secondary structure will be referred to as a hull. The hull is any base or foundation upon which a deck is mounted.

Conventionally, passive mounts are placed at locations between the hull and deck in order to reduce vibratory energy transmission from the deck onto the hull. Usually several mounts are used, depending on the specific installation requirements. Passive mounts reduce vibration transmission by acting as simple springs.

Passive mounts suffer from a number of limitations. For example, proper performance of passive mounts are limited to low frequency applications. Wherein, at high frequencies passive mounts degrade and become wave bearing, thus losing their simple spring like characteristics.

In an attempt to overcome the deficiencies of passive mounts, it has been proposed to position active mounts throughout a system to actively control the noise and vibration of the system. These active mounts typically include a controllable actuator which reduces system vibration or noise by introducing a canceling vibration to the system. The ability to effectively reduce the vibration or noise of a system by the use of active mounts, however, is often limited by the coupling which occurs between the active mounts. Generally, "coupling" describes the effect an actuation of one active mount has on the other active mounts of the same system. As a result, current control of active mounts requires a complex system which attempts to take into account the detrimental mount coupling.

SUMMARY OF THE INVENTION

The advantages and purposes of the invention will be set forth in part in the description which follows, and in part will be obvious from the description, or may be learned by practice of the invention. The advantages and purposes of the invention will be realized and attained by means of the elements and combinations particularly pointed out in the appended claims.

To attain the advantages and in accordance with the purposes of the invention, as embodied and broadly described herein, the invention comprises a vibration reduction system including a base, a disturbance generating device, and at least one active mount connecting the base and disturbance generating device for imparting a force at a point on the base to minimize the transmission of the disturbance to the base. The active mount includes a passive element on which the disturbance generating device is supported, an actuator for imparting a force on at least the base, a sensor located on the base for sensing the total force imparted by the active mount at the point and generating a corresponding signal, and a controller for generating an input signal corresponding to the force to be imparted by the actuator on at least the base and sending the input signal to the actuator. The controller regulates an impedance error as a function of the signal received from the sensor. The force imparted by the active mount at the point on the base substantially counteracts the disturbance applied to the base by the disturbance generating device.

In another aspect of the invention, the active mount further includes a second sensor located on the base for detecting a velocity or acceleration of the base at the point on the base.

In a further aspect of the invention, the invention includes a method of reducing vibrations of a base caused by a disturbance generating device mounted on the base via an active mount. The active mount used in the method includes a passive element and an actuator. The method includes imparting a force from the actuator on at least the base, detecting the force imparted by the actuator and by the passive element on the base, calculating an impedance value for the active mount, regulating an impedance error as a function of the impedance value of the active mount and the detected force, and generating a control signal to control the force imparted by the actuator to control the vibrations on the base.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DESCRIPTION OF THE PREFERRED EMBODIMENT

Reference will now be made in detail to the present preferred embodiments of the invention, examples of which are illustrated in the accompanying drawings. Wherever possible, the same reference numbers will be used throughout the drawings to refer to the same or like parts.

EXEMPLARY VIBRATION REDUCTION SYSTEM

Figure 1:
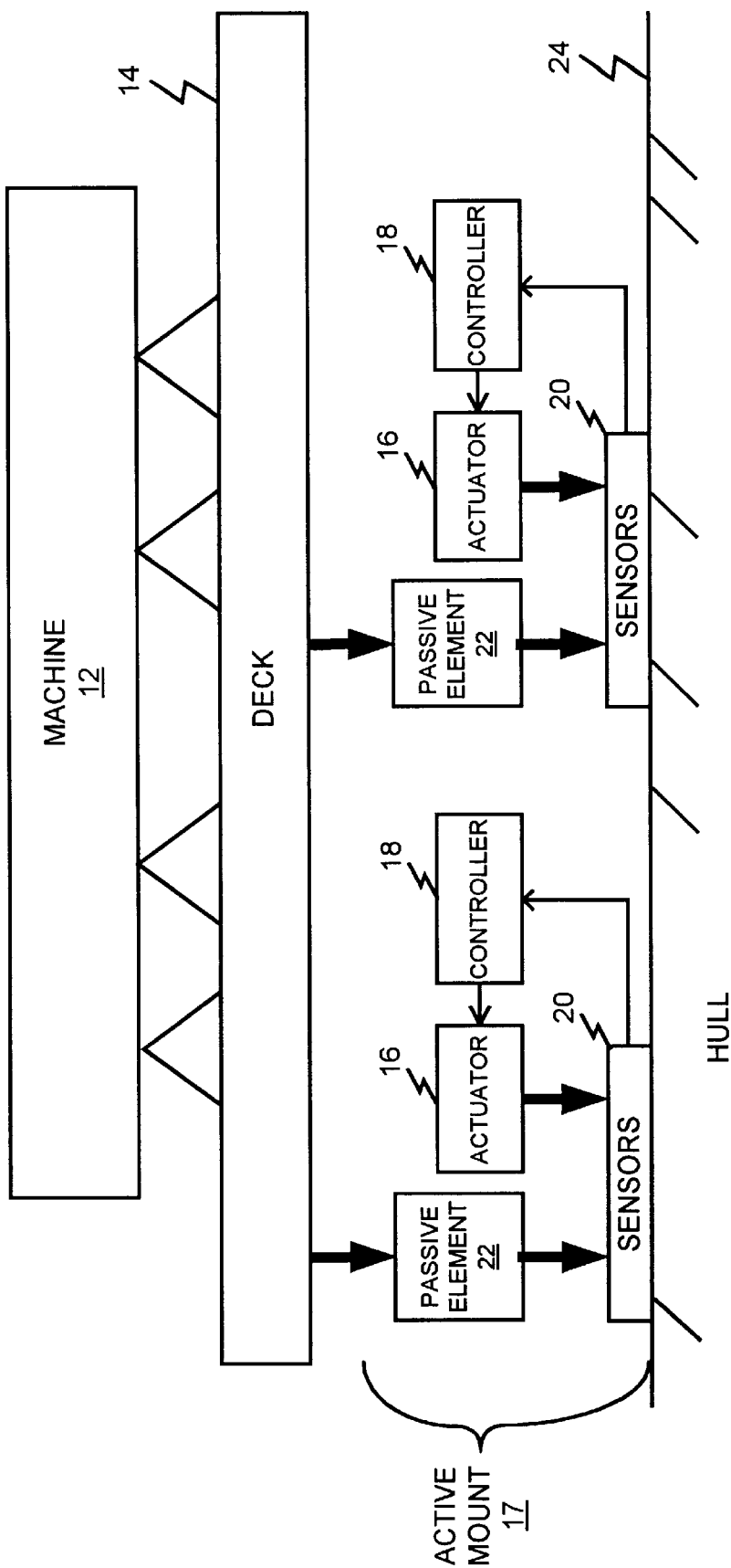
FIG. 1 is a diagram of a vibration reduction system according to the invention.

FIG. 1 is a diagram of a vibration reduction system 10. The vibration reduction system 10 controls the vibrations of a hull 24 and a deck 14 supporting a disturbance generating device 12 and generally includes several active mounts 17 each including a passive element 22, an actuator 16 for imparting a force on at least the hull 24 to counteract vibrations of the hull 24, several sensors 20 located on the hull 24, and at least one controller 18 for regulating the impedance of the active mount 17.

Hull 24 is the foundation upon which the remainder of the system rests. The deck 14 is the structure on which a machine or disturbance generating device 12 is supported. The deck may also be referred to as a raft or a truss. In the illustrated embodiment shown in FIG. 1, the disturbance generating device 12 includes any type of machine which imparts disturbances on the deck, such as a turbine, generator, motor, pump or other structure or device that vibrates or creates a disturbance. Alternately, the disturbance generating device could be mounted directly on the mounts, without the provision of a deck.

The terminology "deck" and "hull" reflects a maritime application, however this invention is not limited to maritime applications. The invention can be applied to any application in which it is desirable to reduce the disturbance energy transmitted from one structure to another structure. This invention can be applied to a variety of applications including, but not limited to, isolating the engine of a car, isolating aircraft engines attached to the wing or fuselage, isolating machinery from floors in buildings to keep energy from being transmitted to the floor, isolating vibration sensitive equipment from floors that vibrate to keep energy from being transmitted to the equipment, isolating equipment mounted in a space station, and isolating machinery in maritime applications. Herein, the terminology used will be that of maritime application for sake of convenience only.

In accordance with the present invention, the deck 14 is mounted on the hull 24 with several active mounts 17 therebetween. As mentioned above, the active mount 17 includes a passive element 22, an actuator 16, a controller 18, and sensors 20. The passive element 22 includes any conventional or novel passive mount, such as an elastomeric or air mount or other design. The actuator 16 includes a transducer, for example, which imparts a force on the below-mount structure or hull 24 to counteract existing vibrations in the system.

Figure 2A:
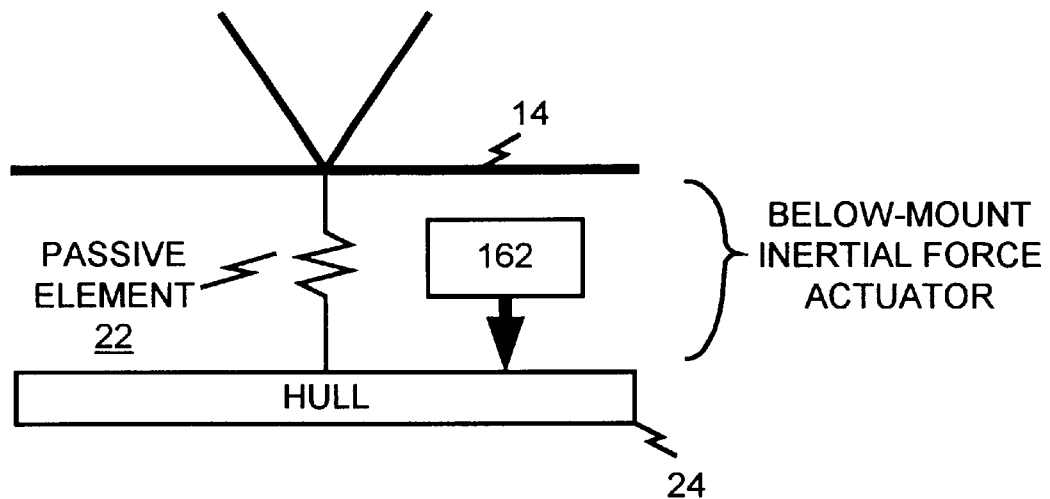
FIG. 2A is an exemplary diagram of an inertial force actuator for use in the active mounts of FIG. 1.
Figure 2B:
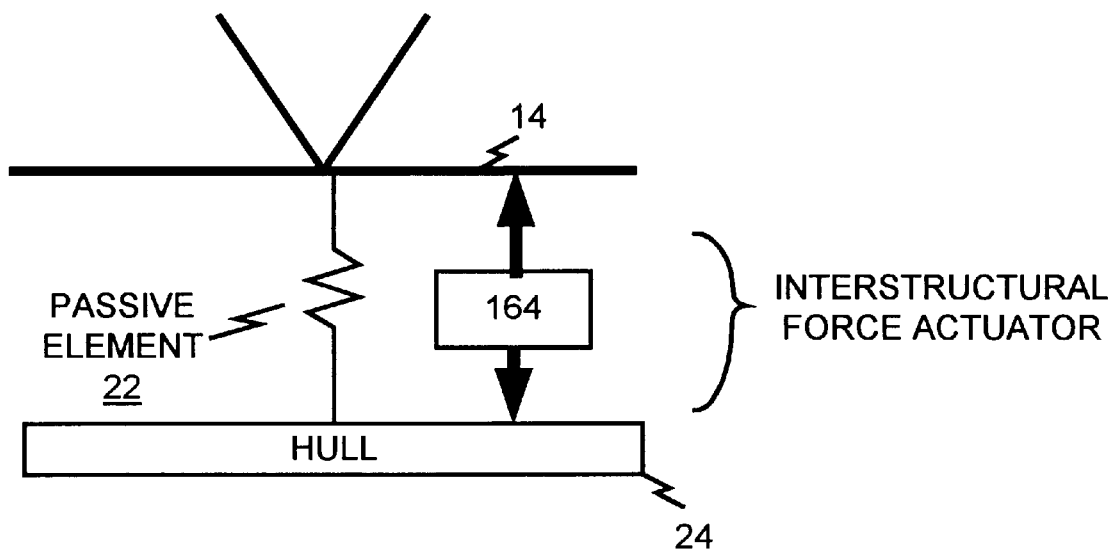
FIG. 2B is an exemplary diagram of an interstructural force actuator for use in the active mounts of FIG. 1.

There are several types of actuators which may be used in the present invention. Two basic types of actuators for imparting a force on the system are illustrated in FIGS. 2A and 2B. The first type of actuator is the inertial actuator 162 (FIG. 2A) and the second type is the interstructural actuator 164 (FIG. 2B).

As illustrated in FIG. 2A, an inertial actuator 162 generates a control force by reacting against an inertial mass. The control force is applied to the hull 24. This type of actuator is called a below-mount inertial actuator because the control force is applied below the mount. An inertial actuator 162 is also commonly referred to as an inertial shaker. The inertial actuator 162 has the advantage of only reacting against the hull 24, and therefore does not create an immediate displacement on the deck 14. This results in less coupling with the other mounts. A number of different types of inertial actuators are known in the art.

As illustrated in FIG. 2B, an interstructural force actuator 164 generates a control force on both the hull 24 and the deck 14. The interstructural force actuator 164 may be of any of the conventional types known in the art, such as piezoceramic actuators, pneumatic actuators, and electromagnetic actuators. The force applied by the interstructural actuator 164 on both the hull 24 and deck 14 results in additional displacement of the deck 14. This additional displacement can make system control more complicated. However, interstructural actuation is generally less expensive than inertial actuation. Other disadvantages and advantages of interstructural actuators compared to inertial actuators will be discussed throughout the specification.

The actuator 16 shown in FIG. 1 is a below-mount inertial actuator 162. It should be understood that the same general principles apply to the use of an interstructural actuator as apply to an inertial actuator, and that the present invention can use either type of actuator.

Figure 3:
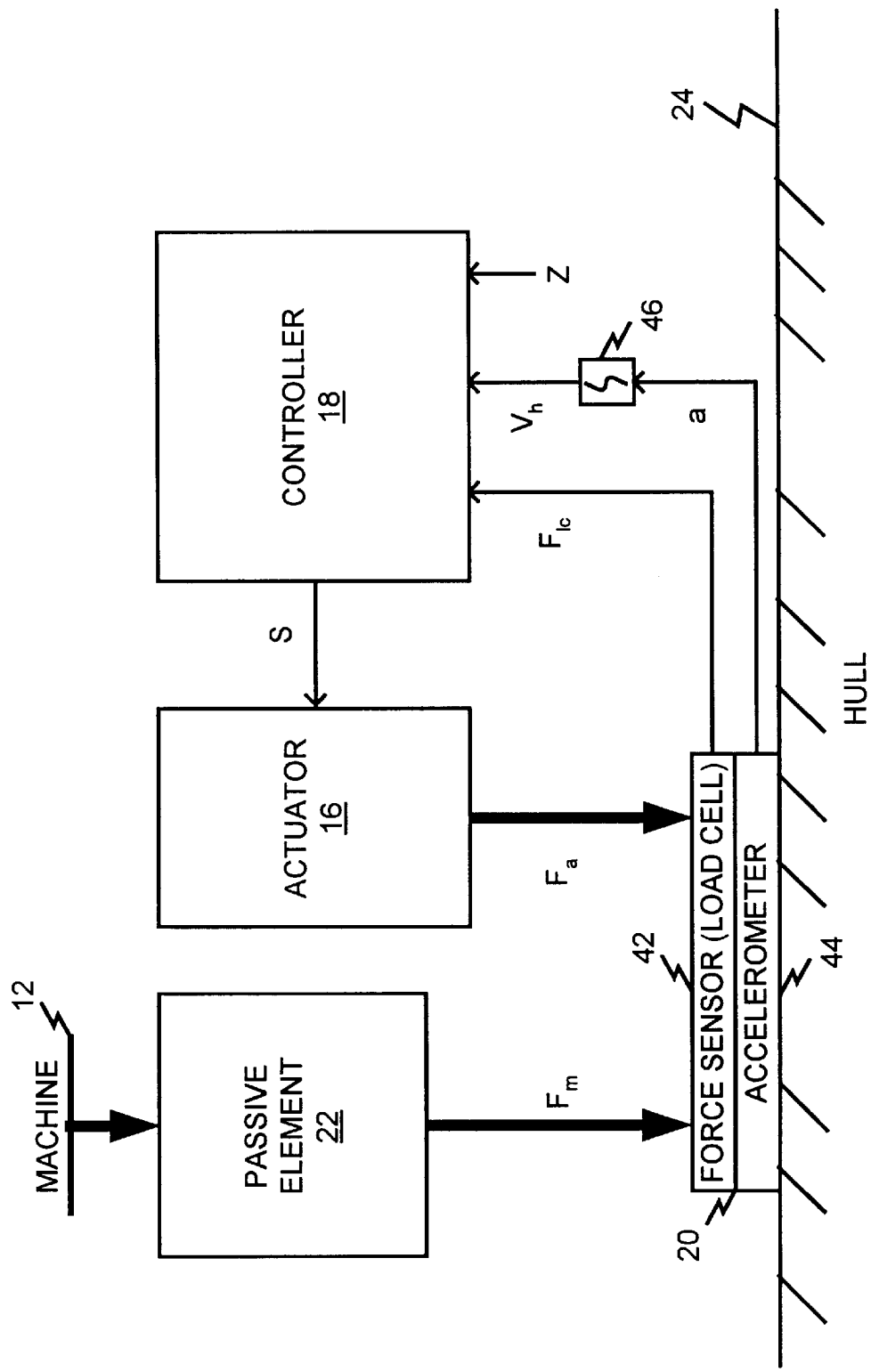
FIG. 3 is a detailed diagram of the vibration reduction system of FIG. 1.

Returning to FIG. 1, sensors 20 are located on the hull 24 at the selected point where the passive element 22 and the actuator 16 connect to the hull. Different types and arrangements of sensors can be used. The sensors 20 are shown in greater detail in FIG. 3. As shown in FIG. 3, the sensors 20 include a load cell sensor 42 and a motion sensor. In the example shown in FIG. 1, the motion sensor is an accelerometer 44. The load cell sensor 42 detects the force on the hull 24 from the actuator 16 and from the passive element 22. The accelerometer 44 detects the acceleration of hull 24 at the point where the passive element 22 and the actuator 16 connect to the hull 24. An integrator 46 is also provided in or adjacent to the controller, as shown in FIG. 3, for integrating the value of the acceleration from the accelerometer into a velocity signal. Typically, an accelerometer is used for the motion sensor, however, the motion sensor could also be a velocimeter or other type of motion sensor. Below, the motion sensor will be referred to as an accelerometer. The output signals from the load cell sensor 42 and the integrator 46 are sent to controller 18.

Returning to FIG. 1, the controller 18 receives signals from the sensors 20 and provides a control signal to the actuator 16. In the implementation of FIG. 1, the controller 18 is a single-input-single-output (SISO) controller. The SISO controller 18 allows each active mount 17 to be controlled independently of the other mounts. As shown in FIG. 1 each active mount 17 includes its own controller 18.

Figure 4:
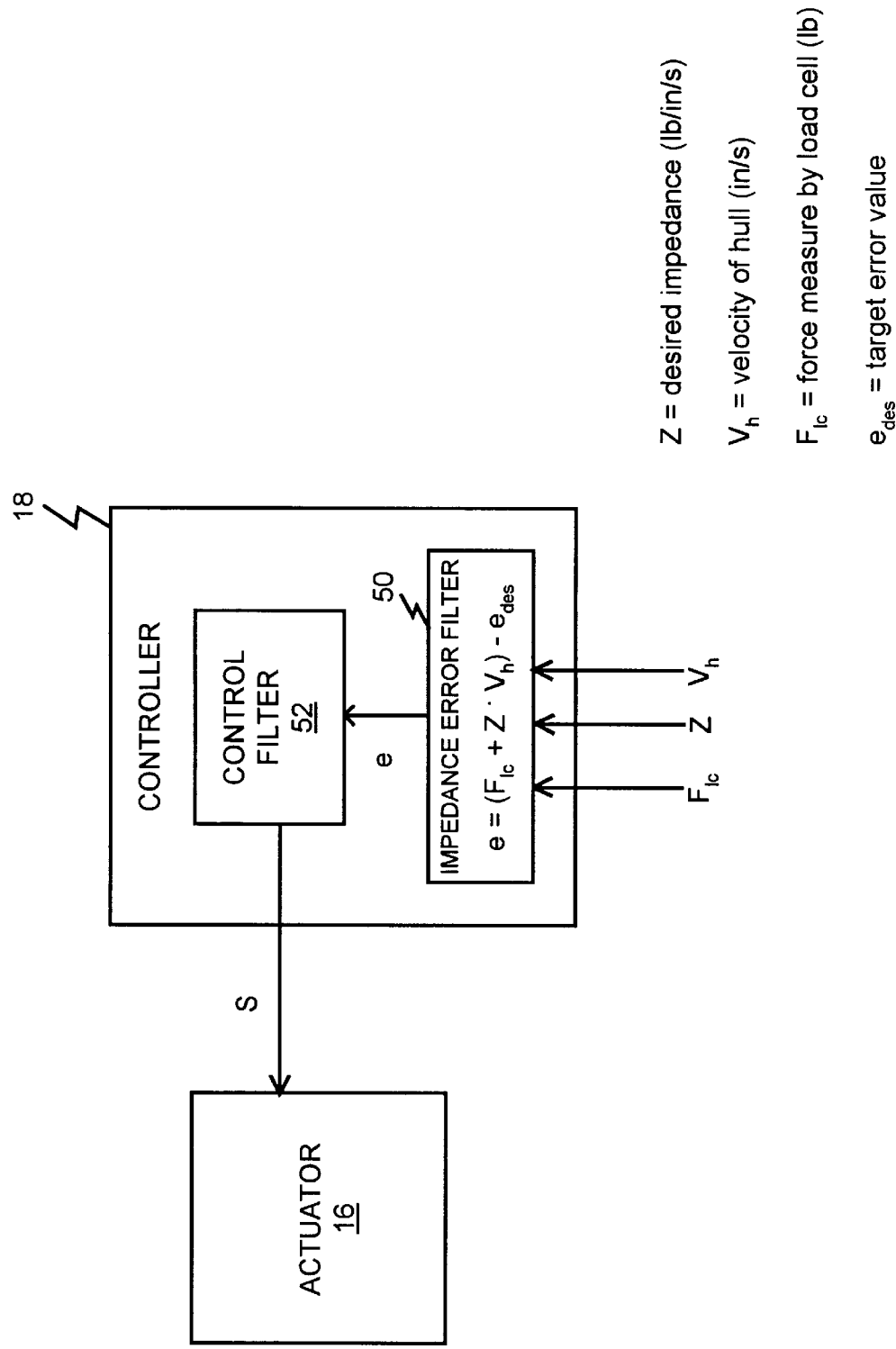
FIG. 4 is an exemplary diagram of the controller of FIG. 1.

FIG. 4 is a detailed diagram of the controller 18. Controller 18 includes an impedance error filter 50 and a control filter 52. Filters 50 and 52 are filters with conventional components. Controller 18 regulates the impedance of the active mounts as seen by the hull. The controller can include analog or digital components, but preferably includes digital components. Generally, the controller 18 receives input values from the load cell 42 and accelerometer 44, as well as a desired impedance, Z, and outputs a control signal "S" to the actuator 16 corresponding to a force to be exerted by the actuator 16 on the hull 24. The actuator acts to reduce the vibration or noise of the hull by imposing a counteracting force upon the hull. This process will be described in greater detail below.

EXEMPLARY PROCESSING

The operation of the vibration reduction system 10 will be described with respect to FIGS. 3 and 4. The vibration reduction system 10 reduces vibrations in the hull 24 by imposing a counteracting force on the hull. The actuator 16 imparts an actuator force $F_a$ onto the hull 24 at a point where the passive element 22 connects to the hull. The passive element 22 applies a mount force Fm at the same connection point on the hull 24, hereinafter referred to as the "connection point." The mount force $F_m$ is a result of the forces generated by the machine 12 vibrating, causing motion of the deck 14 which generates forces in the passive element 22. The load cell 42 detects the total force, $F_{lc}$, applied to the hull 24 as a result of the actuator force and the machine force. The total force $F_{lc}$ is the sum of $F_m$ and $F_a$. Load cell 42 generates a force signal $F_{lc}$ which it transmits to the controller 18.

At the same time as the load cell 42 is detecting the force applied to the hull 24, the accelerometer 44 detects the acceleration of the hull 24 at the same connection point on the hull. The accelerometer 44 generates a signal "a" representing the acceleration of the hull 24 at the selected point. The signal "a" is sent to an integrator 46 that integrates the acceleration signal "a" into a velocity signal $V_h$ representing the velocity of the hull 24 at the connection point. The velocity signal $V_h$ is then sent to the controller 18. Using a velocimeter instead of an accelerometer eliminates the need for integration.

Once the signals representing the load cell force and velocity of the hull 24 are sent to the controller 18, the controller 18 uses an impedance value (described below) to determine a desired impedance error. The impedance error filter 50 (FIG. 4) of the controller 18 calculates the impedance error e using the following equation: $e(f)=[F_{lc}(f)+Z(f)\cdot V_h(f)]-e_{des}(f)$, where $Z(f)$ is the desired impedance value (which is the force output for a given velocity input), $V_h(f)$ is the velocity of the hull, $F_{lc}(f)$ is the force measured by the load cell, and $e_{des}(f)$ is the target error value. This is a frequency domain formulation of the error filter. Frequency domain formulations are commonly used in the art for describing controllers. The time domain formulation is $e(*)=[F_{lc}(*)+Z(*)\cdot V_h(*)]-e_{des}(*)$. Note that frequency domain notation is used in all the subsequent equations herein. The sign (positive or negative) on $Z(f)\cdot V_h(f)$ or $Z(*)\cdot V_h(*)$ depends on the conventions for force and velocity. Herein, the conventions are such that a positive value is used in the impedance filter. Normally, the target error value $e_{des}$ is zero, so that the system targets for a zero value of $F_{lc}+Z\cdot V_h$. The zero value for e can never actually be reached, however. There will always be some value for e such that system continuously operates. The impedance error is "regulated" in this type of system. As will be described below, the value for Z may be constant or may vary slightly with time. The values for the detected $F_{lc}$ and $V_h$ will vary with time and are controlled as a function of the disturbances on the structures, and the impedance of the mount.

The impedance error filter 50 calculates the impedance error e based on the above equation, and generates an error signal "e" that it sends to the control filter 52. The control filter 52 uses the error signal "e" to generate a control signal "S" for the actuator 16. The design and implementation of the control filter is done through one of a variety of techniques, including, but not limited to, optional state space control, robust control, and classical control. The filter is designed to provide reduction in the force transmitted to the hull by minimizing the impedance error. The design must consider the standard control design issues, including, but not limited to control bandwidth, reduction objective, and robustness to plant mismatch.

The control signal "S" causes the actuator 16 to impart a new force $F_a$ on the hull 24. The load cell 42 and accelerometer 44 detect the respective new force and acceleration on the hull 24, and the control process repeats itself.

Using the above process, the present invention regulates the impedance of the active mount as seen by the hull. It is advantageous to regulate impedance, instead of regulating force or velocity, because the regulation of impedance facilitates decoupling of the mounts, which is equivalent to saying that the plant transfer matrix is highly diagonal.

The plant transfer matrix is the matrix of transfer functions from the actuator inputs to the control error signals at all the mounts. If there were 20 mounts, this would be a 20×20 matrix. The off-diagonal elements of this matrix (i.e. element (n,m) where n is not equal to m) represent the transfer functions from force at mount m to error signal at mount n. The diagonal elements (i.e. element (n,n)) represent the transfer functions from force to error signal at mount n. If all the elements in the matrix are of comparable magnitude, actuating any one mount generates similar error signals at all the mounts. If the off-diagonal elements are small compared to the diagonal elements, then actuating a mount generally only results in an error signal at that mount, and not the others.

Impedance regulation facilitates making the plant transfer matrix more diagonal and facilitates decoupling compared to other standard approaches. Velocity regulation typically results in a large amount of mount coupling. Force regulation can make the plant more diagonal than velocity regulation and hence make SISO control more effective to sufficiently control the hull disturbances. However, force regulation alone does not ensure mount decoupling. Impedance regulation as described in the instant invention, however, allows for a greater degree of decoupling compared to force regulation alone and can in some cases completely decouple the mounts where force or velocity regulation alone could not.

It is desirable to have the mounts decoupled because decoupling allows for use of multiple SISO controllers instead of a larger multiple-input-multiple-output (MIMO) controller. Control of a highly coupled plant generally requires a MIMO controller which can have upwards of N×N control filters (where N is the total number of mounts). Control of a decoupled plant can typically be implemented with N SISO controllers, one at each mount. There are a number of reasons to avoid using a single large MIMO controller and strive for multiple SISO controllers, or several smaller MIMO controllers.

Plant identification and filter design algorithms tend to become more reliable with a simpler arrangement of SISO controllers. With an SISO arrangement, all controller electronics can be kept local to the mount. This allows the possibility of packaging the controller electronics within the mount, thus reducing the need for cabinet space and a large amount of electrical wiring. With local wiring, problems of wire damage and electromagnetic interference are reduced.

In addition, SISO control eliminates centralized operation, thereby making a single point of failure impossible. Lastly, having each mount operate independently simplifies maintenance such that upgrades and replacements can be made on a mount-by-mount basis without requiring a full system upgrade/replacement. In light of all this, it is preferable to have a system which is capable of having an independent controller for each actuator, as shown in FIG. 1.

If the desired impedance Z in the impedance filter 50 is exactly equal to the impedance seen by the hull looking into the passive elements, backed by the deck, then the plant will be perfectly decoupled. This is the ideal impedance to be implemented in the impedance filter 50. In general, the closer the desired impedance Z is to the ideal, the greater the degree of decoupling. The degree to which the desired impedance must equal the ideal impedance depends on a number of factors, including the performance objective of the controller and the dynamics of the deck and hull. Whatever the requirements, the desired impedance needs to be implemented based on the impedance seen by the hull looking into the mount.

There are a variety of ways to calculate/measure this impedance. Some of these methods will be discussed below.

The first method for measuring the impedance is to calculate a fixed impedance by analyzing the system. If the system design indicates that it is sufficient to have the desired impedance equal to the blocked impedance of the passive element (i.e., when one end of the mount is restrained by an infinite mass), then the impedance can be set equal to the actual passive element impedance. The actual passive element impedance can be measured in the laboratory using standard mount impedance measuring techniques, or it could be taken from the manufacturer's specifications. If the system design indicates that the desired impedance needs to include dynamics of the above-mount structure (deck), then the desired impedance can be computed from FEA models or lumped parameter models. Alternately, a test rig could be built in a laboratory and used to measure the impedance matrix of the deck on the mounts. If a fixed impedance value is used, this value is entered into the controller 18 as the value Z.

Using a fixed impedance is often unacceptable, however, especially if there is a large amount of wear and tear on the mounts, or if the environmental conditions change greatly. Several different methods can be used to calculate an adaptable impedance. A first method for calculating an adaptable impedance uses parameterized models, a second method uses in-situ estimations based on existing below-mount vibration, and a third method uses in-situ estimations based on shaker excitation. These adaptable approaches will be discussed below.

Under the first method for calculating an adaptable impedance, the desired impedance may be modeled as a function of key parameters such as temperature, age, mount height(s), weight distribution, etc. These parameters will vary with time. The desired impedance can be calculated by measuring these parameters and then computing the desired impedance by using a table or basic equations. For example, if the desired impedance is that of a simple spring whose stiffness varies with temperature, the desired impedance may be modeled as $Z_{des}(w)=[K_0+(K_1 \cdot Temp)]/(jw)$, where Temp is the measured temperature; $K_0$ and $K_1$ are parameters computed in the laboratory or provided by the manufacturer; j is the imaginary number; and w is a frequency in radians/second.

The second and third methods for calculating an adaptable impedance use an in-situ impedance measurement.

In the second method, the source of below-mount vibration which is used for in-situ estimation of the impedance value is existing vibrations in the hull. For example, there may be vibrations on the hull 24 at a known frequency. Periodically, the controller 18 and actuator 16 could be turned off for short periods of time. The load cell force and hull velocity could be measured at the known frequency. The mount impedance could then be calculated based on these quantities. For example, if the desired impedance is to be modeled as a simple spring, the desired impedance will be equal to K/(jw), where K is a constant to be determined by in-situ measurement, j is the imaginary number, and w is a frequency in radians/second. The value for K is calculated as follows: $K=F_{lc}(f1)\cdot(jw)^2/a_{bm}(f1)$, where $F_{lc}(f1)$ is the force detected at the load cell 42 at the known excitation frequency f1, and $a_{bm}(f1)$ is the below-mount acceleration at that same frequency.

Figure 5:
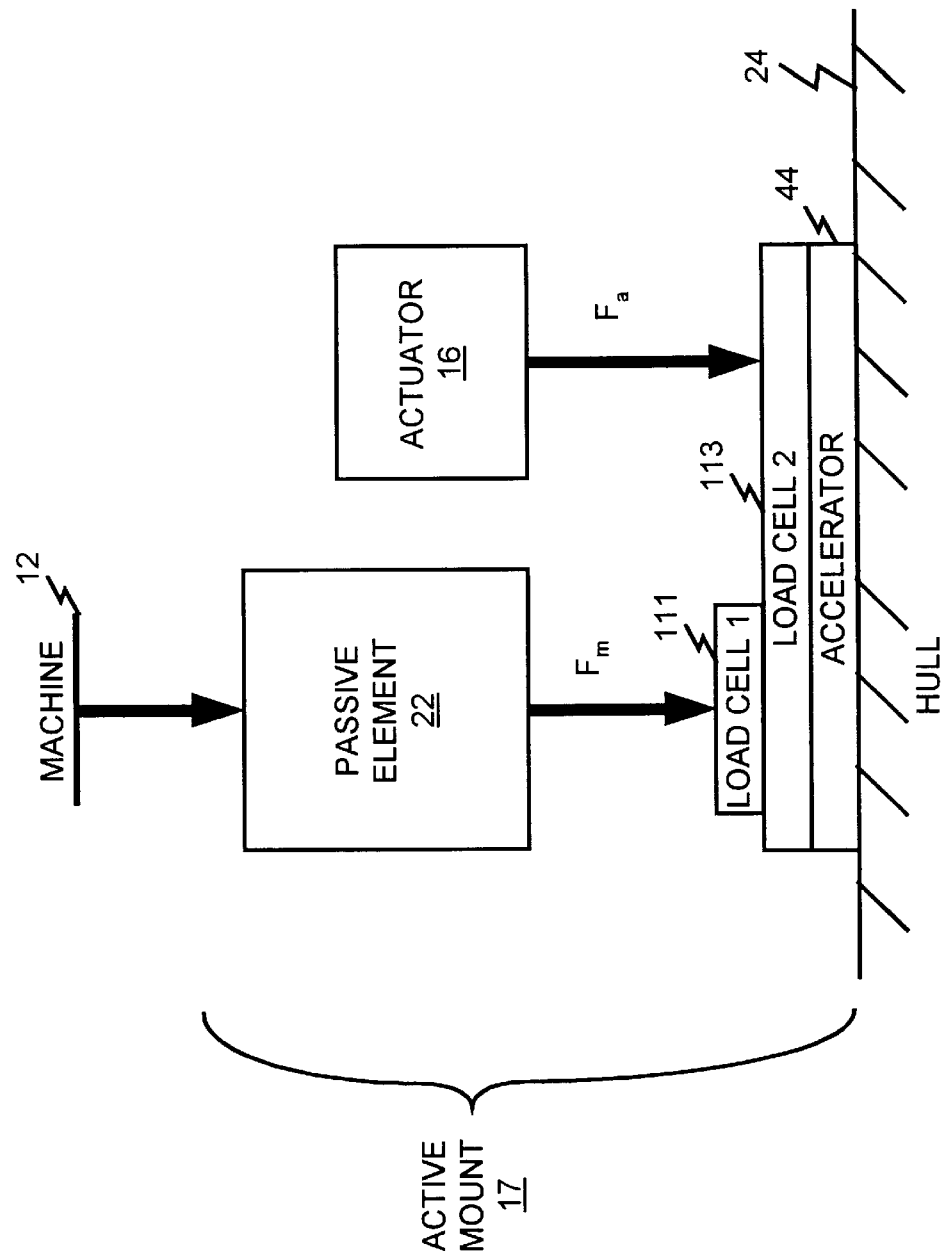
FIG. 5 is a diagram of an alternate arrangement of sensors to be used for calculating the impedance value of an active mount in a manner consistent with the present invention.

In the third method, the source of below-mount vibration which can be used for in-situ estimation of the impedance value is the inertial actuator. In order to use this technique, a load cell arrangement as shown in FIG. 5 will be needed. In the implementation of FIG. 5, the load cell arrangement includes first and second load cells 111 and 113, respectively. This technique will be necessary if there is insufficient hull excitation or if the measurement needs to be made over a range of frequencies. In this scenario, the calibration excitation is imparted by the actuator. In FIG. 5, the force imparted by the machine 12 and passive element 22 is measured by the first load cell 111. This force will be referred to as $F_m$. The total force imparted by the actuator and the mount is measured by a second load cell 113 and will be referred to as $F_{a+m}$. In this technique a predetermined calibration force $F_a$ is imparted on the hull 24 by the actuator 16. The controller 18 could be turned off to make this measurement, at which time the actuator 16 would be used to impart this predetermined calibration force. Alternately, the calibration force could be imparted while the controller 18 was operational (this is commonly referred to as "on-line" calibration).

For the above method, there are a number of ways in the art for designing the calibration force and making the measurements. An example of a system in which calibration is done while the controller is operational is U.S. Pat. No. 5,796,849 to Coleman et al. For the discussion below, assume that the controller 18 is turned off when the calibration force $F_a$ is imparted by the actuator on the hull 24. The desired impedance is computed using the force $F_m$ measured by the first load cell 111 and the acceleration $a_{bm}(w)$ measured by the accelerometer 44. The desired impedance $Z_{des}$ is equal to $F_m(w)\cdot jw/a_{bm}(w)$, where $F_m(w)$ is the force on the first load cell 111 when the actuator 16 is driven; j is the imaginary number; w is a frequency in radians/second; and $a_{bm}(w)$ is the below-mount acceleration. If there are other excitations that result in extraneous forces or accelerations (i.e. measurement "noise"), standard coherent processing techniques common in the art can be used to discriminate between the noise and the calibration signal.

In addition to helping decouple the mounts, the regulation of impedance has other benefits over the existing force or velocity regulation systems. Another major benefit is that the actuator only has to be "sized" for the forces due to the above-mount disturbances and not the forces resulting from motion of the below-mount structure. The forces transmitted through the mount are due to displacements of both the above and below-mount structures. Typically, a primary concern is preventing large above-mount motions from generating forces that are transmitted to the below-mount structure. However, there may already be some motion on the below-mount structure that generates force on the mount. If the system were to regulate either force alone, or below-mount velocity alone, the actuator would have to be sized to also cancel the force or velocity due to the below-mount excitation. If the force/velocity from the below-mount excitation is a significant component of the total force/velocity then the actuator would need to be made larger than would be required if only the force/velocity of the above-mount excitations were considered.

A benefit of impedance regulation is that it inherently discriminates between forces coming from the above-mount structure and the below-mount structure. If the force on the load cell 113 is due only to motion of the hull, then no error signal will occur. Therefore, the error signal does not include components due to vibration of the below mount structure. Because the controller does not try to cancel the effect of motion of the below-mount structure, the actuators only have to be sized to cancel the disturbance transmitted by the above-mount motion.

Unlike other known systems, the vibration control system of the present invention uses impedance regulation based on a force imparted from both the passive element and the actuator, not the actuator alone.

ALTERNATIVE VIBRATION REDUCTION SYSTEM

Figure 6:
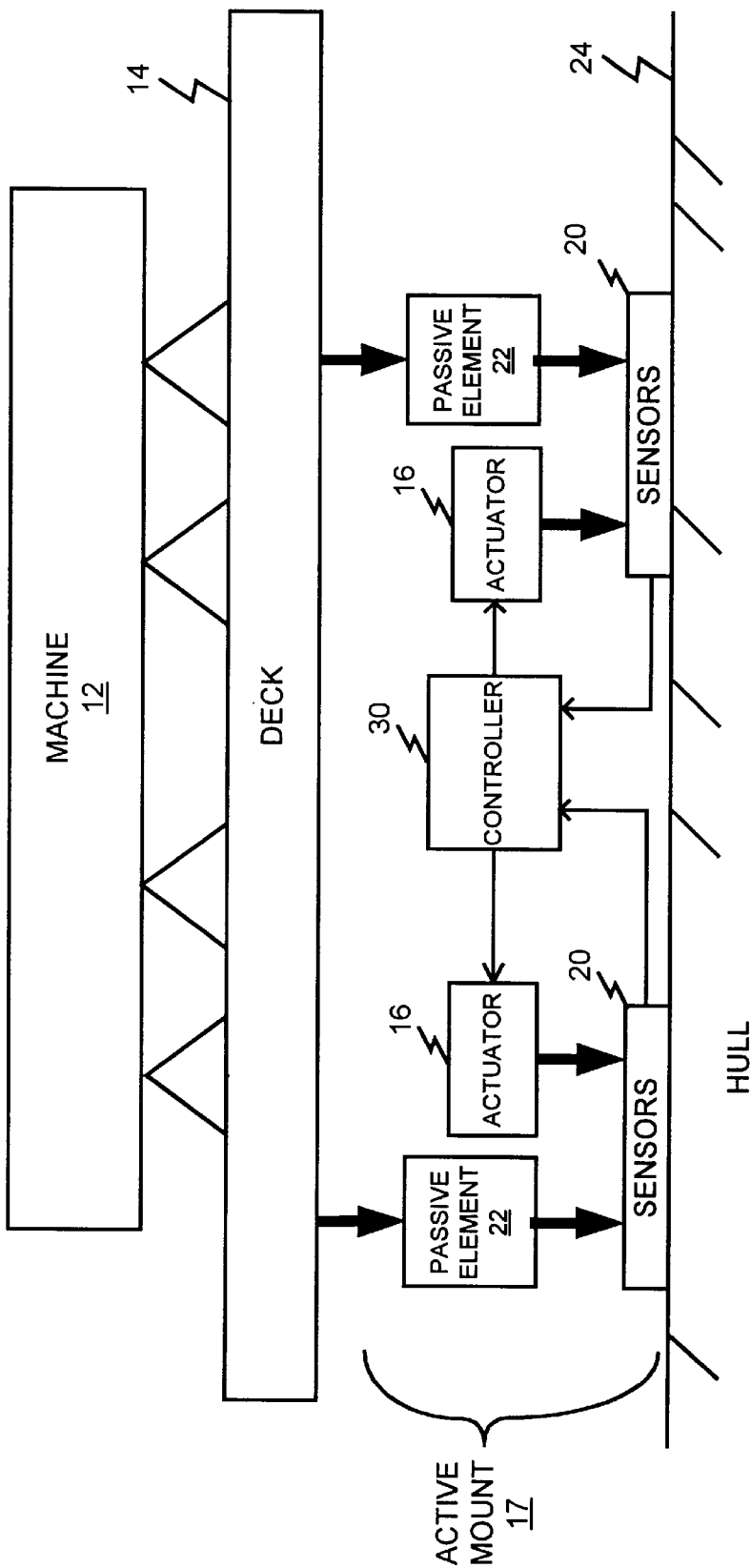
FIG. 6 is a diagram of another vibration reduction system consistent with the present invention.

FIG. 6 is a diagram of an alternate implementation of a vibration reduction system 101 using a multiple-input-multiple-output (MIMO) controller 30. In this implementation, several actuators 16 are controlled by a single controller 30. The implementation of FIG. 6 uses MIMO controllers instead of the SISO arrangement previously discussed for FIG. 1.

As discussed previously, mount decoupling (i.e. plant diagonalization) tends to improve as the desired impedance Z in FIG. 4 approaches the actual impedance looking into the base of the mount. In general, the impedance seen looking into the base of the mounts is a matrix of input and transfer impedances, which relate the interactions between the mounts when attached to the deck. Generally, the deck dynamics are such that this impedance matrix is largely diagonal and each mount can be modeled as being disconnected from the other mounts. In this case, the desired impedance implemented in each controller is the impedance seen looking into the mount from the hull as was described in the discussion of FIGS. 1, 3 and 4.

In the more general case, it is possible that the desired impedance needs to be modeled as an impedance matrix (or several impedance matrices). In this case, the impedance error filter is a MIMO filter (or several MIMO filters), whereas the control filters can still be SISO. Nonetheless, the full controller is now a MIMO filter (or several MIMO filters). Even though the controller is no longer purely SISO, these sorts of implementations can still reduce overall controller complexity compared to what may be required for a force or velocity regulated approach. Whether the desired impedance needs to be implemented as a matrix depends on factors including the performance goals and the deck and hull dynamics.

Figure 7:
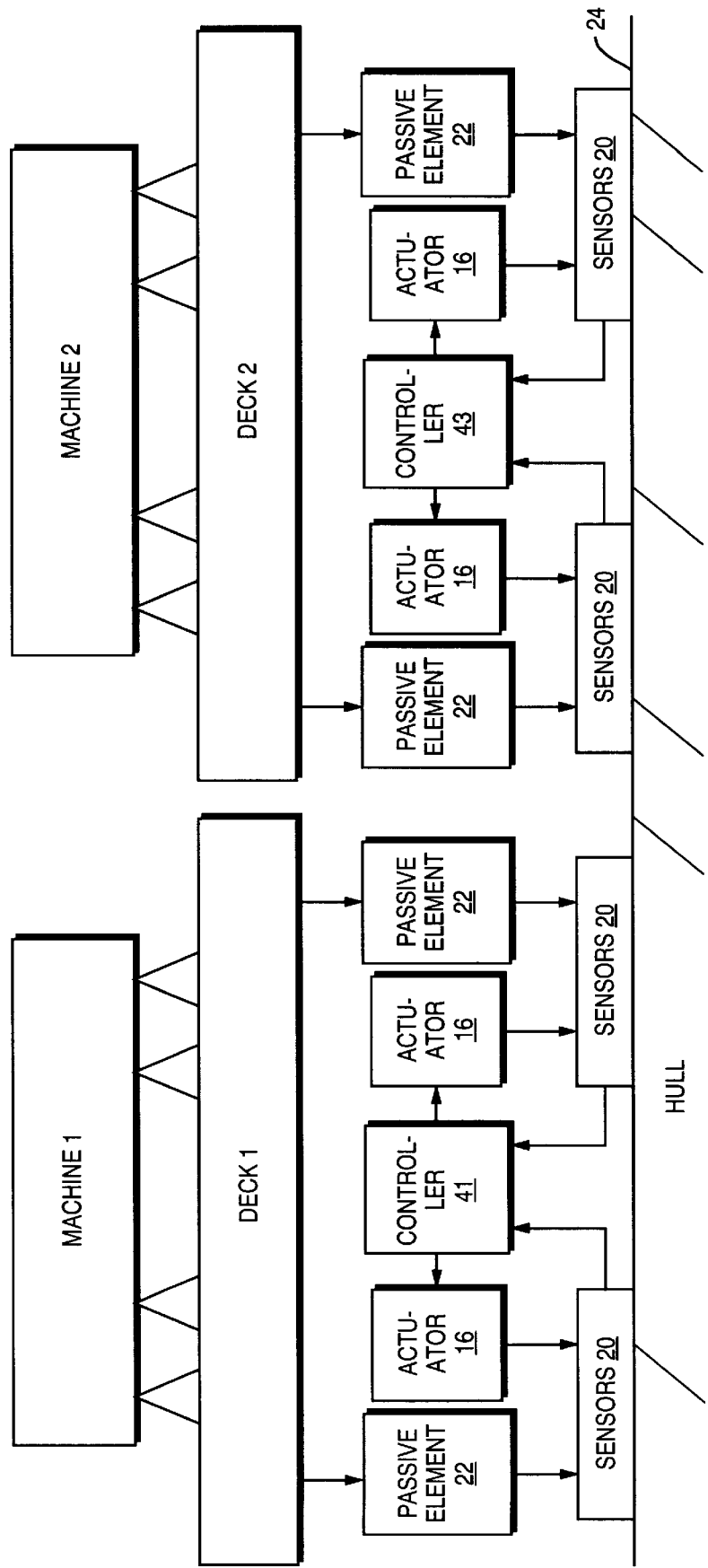
FIG. 7 is a diagram of yet another vibration reduction system consistent with the present invention.

There are a number of other arrangements that fall between the two implementations of FIG. 1 and FIG. 6. An example of another implementation of the controllers is shown in the vibration reduction system 102 of FIG. 7. In FIG. 7, a first group of actuators are paired with a first controller 41, while a second group of actuators are paired with a second controller 43. Each controller is a MIMO controller because they each control several actuators. The system shown in FIG. 7 is an example of an implementation of the invention that may require MIMO controllers but still be less complex than would be required for standard approaches. If each deck is supported on N impedance regulated mounts, each of the two MIMO controllers is a N×N controller. If force regulation were utilized, the resultant controller may be a MIMO controller controlling all the mounts simultaneously and hence be a 2N×2N controller, which would require four times the number of digital filters.

A number of other possibilities also exist. They include: (1) decoupling the controllers at high frequencies and coupling the controllers at low frequencies (i.e., 5 to 10 Hz); (2) providing separate SISO controllers at each mount with an adaptation supervisor that coordinates the control filter adaptation among the different mounts; and (3) providing each mount with a SISO controller that can also perform independent plant identification, but that shares a common status monitor with other controllers. It should be understood that the present invention could include any of these arrangements as well as others which have not been specifically described.

Figure 8:
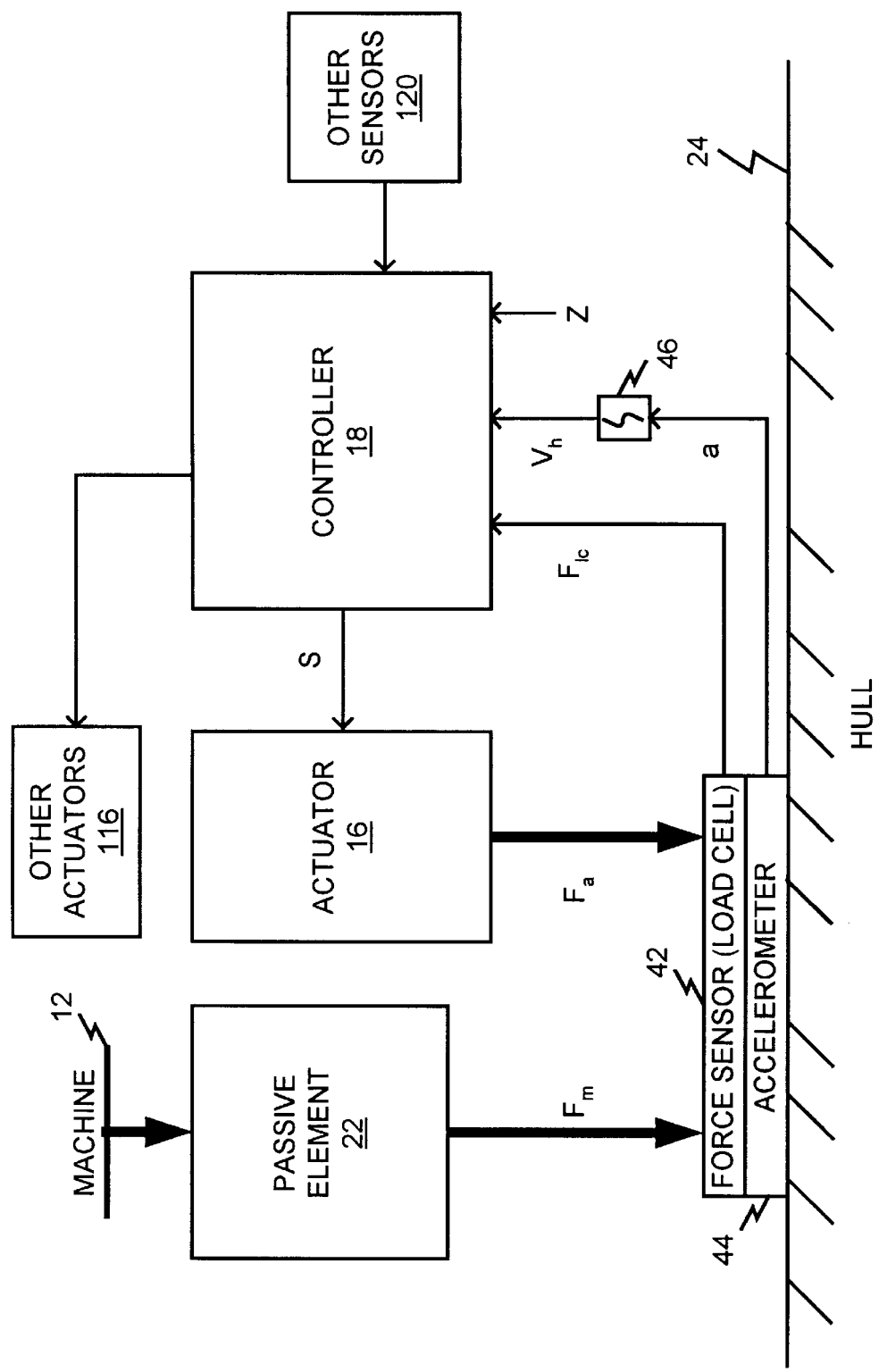
FIG. 8 is a detailed diagram of the vibration reduction systems of FIGS. 6 and 7.
Figure 9:
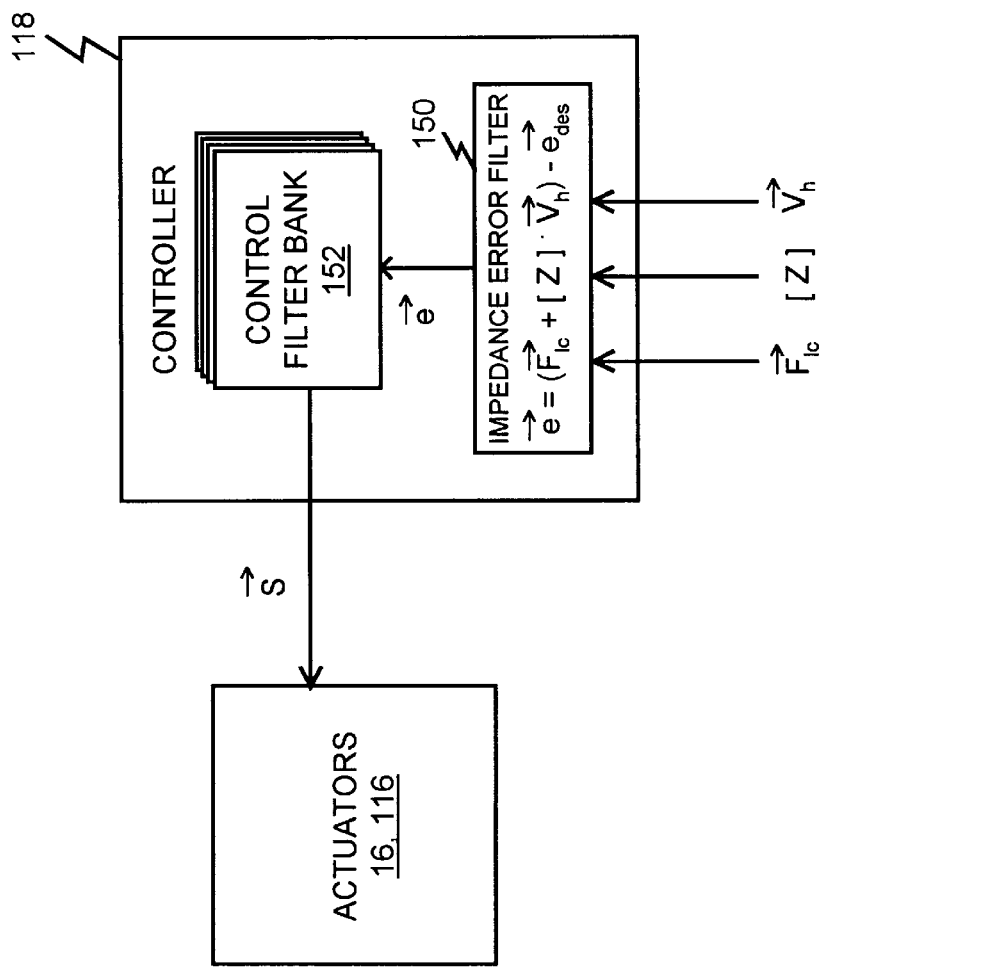
FIG. 9 is a detailed diagram of the controller of FIGS. 6 and 7.

FIGS. 8 and 9 illustrate the control diagrams for the MIMO controllers shown for example in FIGS. 6 and 7. Each MIMO controller 118 is responsible for more than one actuator 16. Each controller will have several sets of sensors which will send it signals. Several values for $F_{lc}$, $V_h$ will be sent to the controller in the form of vectors. A desired impedance matrix will also be calculated by one of the methods previously described. The impedance error filter 150 will calculate the impedance error based upon the load cell forces vector, hull velocity vector, and desired impedance matrix. The error signal will then be sent to the control filter bank 152, which is implemented as a set of independent SISO control filters. The control filter bank 152 then sends out control signals "S" to the actuator 16 and at least one other actuator 116.

EXEMPLARY FEEDFORWARD ARCHITECTURE

Figure 10:
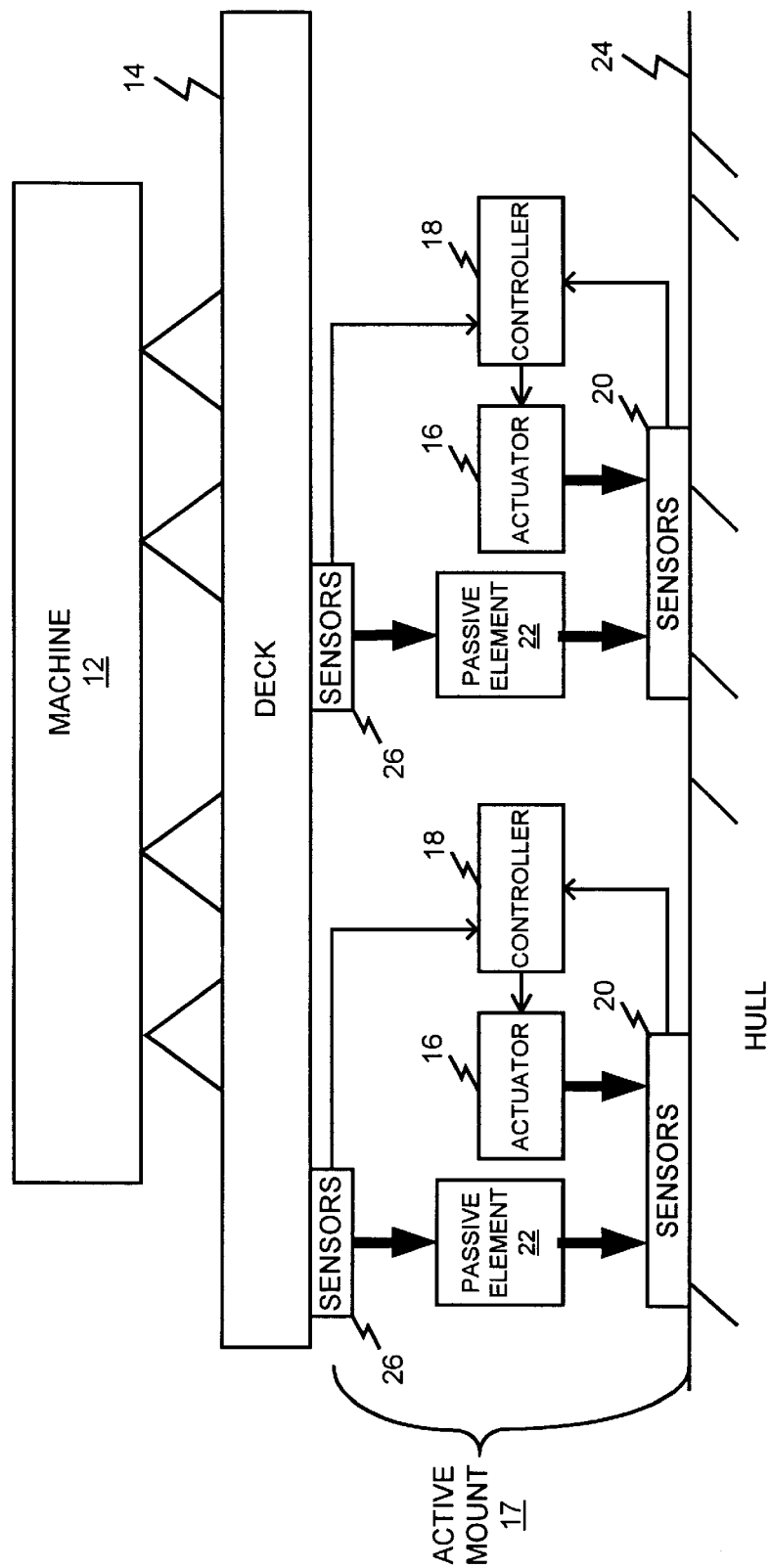
FIG. 10 is an exemplary diagram of a vibration reduction system using feedforward control.

Although the vibration reduction systems illustrated in FIGS. 1, 6, and 7 use a feedback control architecture with below-mount sensors, the present invention can alternately use a feedforward control architecture. FIG. 10 illustrates an example of a feedforward architecture with above-mount sensors 26. There are many other types of feedforward controllers which can be envisaged. In the FIG. 10 arrangement of the vibration reduction system 103, for example, above-mount sensors 26 are arranged at the junction of each mount 20 and the deck 14. Sensors 26 include a force sensor and an accelerometer (or velocimeter). The signals from the above-mount sensors 26 are sent directly to the control filter in the controller 18 to calculate the actuator control signal. The signal from the below-mount sensor is merely used to compute the appropriate filter coefficients. Additionally, it should be noted that although FIGS. 1, 6, and 7 only show inertial actuators, interstructural actuators may be used for both the feedback and feedforward architectures.

It will be apparent to those skilled in the art that various modifications and variations can be made in the vibration reduction system and method for reducing vibrations, use of the system of the present invention, and in construction of this system without departing from the scope or spirit of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A vibration reduction system comprising:

a base;

a disturbance generating device that causes a disturbance in the base; and a plurality of active mounts, connected to the base and the disturbance generating device, for imparting forces at points on the base to minimize transmission of a disturbance to the base from the disturbance generating device, each of said active mounts including:

a passive element, connected to the base, that supports the disturbance generating device, an actuator that imparts a force on at least the base, a sensor, connected to the base, that senses a total force imparted by the active mount at a respective one of said points and generating a signal representing the total force, and a controller that regulates an impedance error as a function of the force signal from the sensor, the controller generating an input signal based on the regulated impedance error to control the actuator to impart a force on at least the base, said force imparted by the active mount substantially counteracting the disturbance in the base caused by the disturbance generating device.

2. The vibration reduction system according to claim 1, wherein said force imparted by the active mount includes said force imparted on the base by the actuator and a second force caused by the disturbance generating device through the passive element.

3. The vibration reduction system according to claim 1, wherein each of the active mounts further includes a second sensor located on the base for detecting a velocity or acceleration at said point on the base.

4. The vibration reduction system according to claim 3, wherein the controller further regulates the impedance error as a function of the velocity or acceleration detected by the second sensor.

5. The vibration reduction system according to claim 1, wherein the controller further regulates the impedance error as a function of a measured impedance.

6. The vibration reduction system according to claim 5, wherein said measured impedance represents an impedance imposed on the base by said active mount and by said disturbance generating device.

7. An active mount for reducing vibrations on a base caused by a disturbance generating device, comprising:

a passive element that supports the disturbance generating device and imparts a first force on the base;

an actuator that imparts a second force on at least the base;

a plurality of sensors, connected to the base, that detects a total force imparted on the base by the passive element and by the actuator, and that detects a velocity or acceleration of the base; and a controller that generates a signal to control the actuator to exert the second force on the base, said controller regulating an impedance error of the active mount as a function of the force and the velocity detected by the sensors to generate the signal, said second force imparted by the actuator substantially counteracting the vibrations on the base caused by the disturbance generating device through the passive element.

8. A method of reducing vibrations on a base caused by a disturbance generating device mounted on the base via an active mount, the active mount including a passive element and an actuator, the method comprising:

imparting a force from the actuator on at least the base;

detecting a force imparted by the actuator and by the passive element on the base;

calculating an impedance value representing an impedance imposed on the base by the active mount and by the disturbance generating device;

regulating an impedance error as a function of the impedance value and the detected force; and generating a control signal to control the force imparted by the actuator to reduce the vibrations on the base.

9. The method of reducing vibrations according to claim 8, further comprising detecting a velocity or acceleration of the base.

10. The method of reducing vibrations according to claim 9, wherein the impedance error is also regulated as a function of the detected velocity or acceleration of the base.

11. The method of reducing vibrations according to claim 8, wherein the imparting of force from the actuator on the base further includes exerting a force from the actuator onto the disturbance generating device.

12. A method of reducing vibrations in a base caused by a disturbance generating device mounted on an active mount above the base, the active mount including a passive element and an actuator, the method comprising:

detecting a force imparted on the base by the actuator and by the passive element;

detecting a velocity of the base;

measuring an impedance;

regulating an impedance error equal to said force detected on the base plus the measured impedance multiplied by the detected velocity of the base; and generating a control signal to vary a force imparted by the actuator on the base so as to reduce the vibrations in the base.

13. The method of reducing vibrations according to claim 12, further including imparting a force from the actuator on the base.

14. The method of reducing vibrations according to claim 12, wherein said measured impedance represents an impedance imposed on the base by the active mount and by the disturbance generating device.

* * * * *